United States Patent [19]
Beneke

[11] 3,896,911
[45] July 29, 1975

[54] TWO-SPEED CLUTCH AND BRAKE SYSTEM

[75] Inventor: Jene A. Beneke, Parker, Tex.

[73] Assignee: Verson Allsteel Press Co., Dallas, Tex.

[22] Filed: Mar. 25, 1974

[21] Appl. No.: 454,271

[52] U.S. Cl. .............................. 192/18 A; 192/4 R
[51] Int. Cl. ............................................. F16d 67/04
[58] Field of Search ........................... 192/18 A, 4 R

[56] References Cited
UNITED STATES PATENTS

| | | | |
|---|---|---|---|
| 3,077,252 | 2/1963 | Treer ................................. | 192/18 A |
| 3,354,994 | 11/1967 | Sieving et al. ................ | 192/18 A X |
| 3,424,285 | 1/1969 | McRay ............................ | 192/18 A |
| 3,561,279 | 2/1971 | Beneke .......................... | 192/4 R X |

FOREIGN PATENTS OR APPLICATIONS

| | | | |
|---|---|---|---|
| 525,124 | 8/1940 | United Kingdom ............... | 192/18 A |

*Primary Examiner*—Benjamin W. Wyche
*Attorney, Agent, or Firm*—Richards, Harris & Medlock

[57] ABSTRACT

High and low speed clutch assemblies are spaced apart along a rotatable shaft. Each of the clutch assemblies includes a plurality of annular friction plates which may be engaged by movement of annular pistons. A brake assembly is mounted between the clutch assemblies and includes friction surfaces carried about the rotatable shaft and annular brake plates mounted on opposite sides of the friction surfaces. A stationary housing is mounted about the brake assembly. Adjacent ones of the pistons and the brake plates are interconnected, such that the friction surfaces of the brake assembly are disengaged when either of the clutch assemblies are engaged by application of fluid pressure. The pistons and brake plates are spring-loaded such that when both of the clutch assemblies are disengaged, the brake plates move to engage the friction surfaces with the stationary housing to brake the shaft.

10 Claims, 7 Drawing Figures

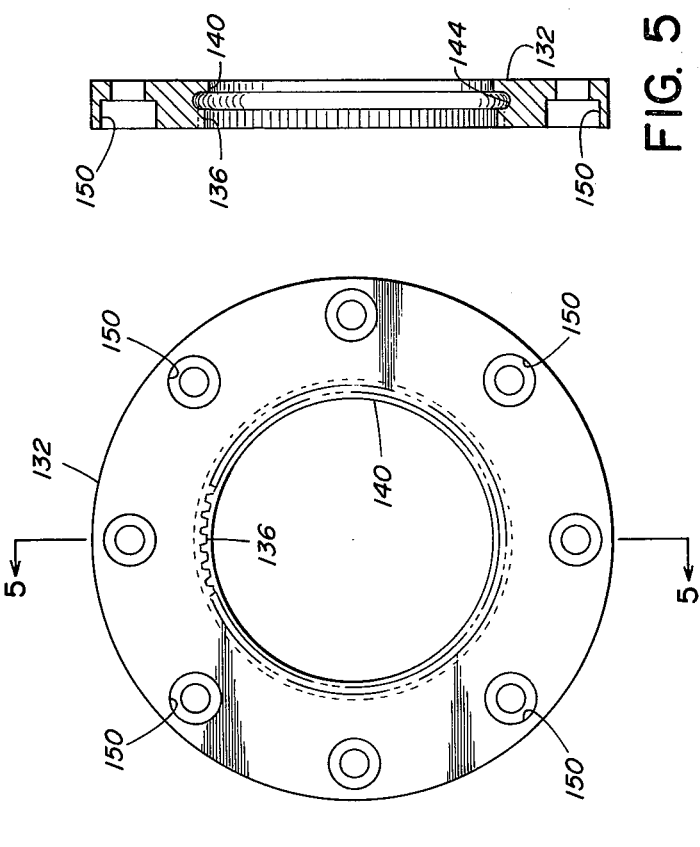
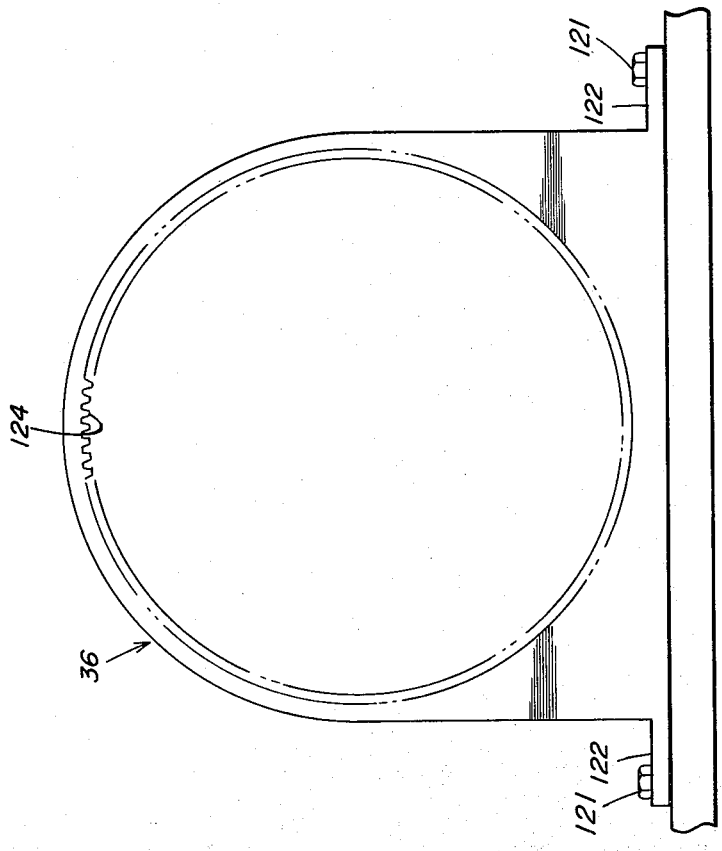

TWO-SPEED CLUTCH AND BRAKE SYSTEM

FIELD OF THE INVENTION

This invention relates to clutch and brake mechanisms, and more particularly relates to clutch and brake systems for use on presses, press brakes and the like.

THE PRIOR ART

It has heretofore been known to utilize duplex or back-to-back clutches mounted on a rotating press brake shaft to provide a two-speed press brake system. For example, such systems are described and claimed in U.S. Pat. No. 3,498,424, issued Mar. 3, 1970, and entitled MULTIPLE SPEED MECHANICAL TRANSMISSION SYSTEMS. While such previously developed two-speed systems have operated well in practice, the systems have generally required the use of a separate dry friction brake in order to stop the rotating shaft. Further, such prior two-speed systems in some instances have been subject to operation with both a clutch and the brake energized.

In U.S. Pat. No. 3,595,353, issued July 27, 1971, and entitled COUPLINGS WITH STATIONARY SPRING AND FLUID MOTOR, by Applicant and assigned to the present assignee, a single speed clutch and brake system is disclosed. This system utilizes a "wet" brake system, but does not disclose a two-speed clutch system in combination with a "wet" brake which cannot be simultaneously energized with one of the clutches.

Further, it is important during normal operation of presses and press brakes that the time interval between the release of the brake and the engagement of the clutch be set to the shortest time possible for the conditions presently being operated under. In addition, as the type of material being formed and the forming operations vary, it would be desirable to be able to selectively vary the time interval between the release of the brake and the application of the clutch. Further, in some presses, and in particular deep draw presses, cushion structure is utilized under the work piece to apply an upward force against the work piece. During initial set-up operations of such presses having cushions, the press clutch is operated such that die is inched or jogged downwardly into the work piece. It is important during such inching set-up operations that the brake be applied during the time that the clutch is de-energized, to prevent the upward force exerted by the cushions from tending to back up the press die drive.

SUMMARY OF THE INVENTION

In accordance with the present invention, a two-speed clutch and brake system is provided which may advantageously be used in press and press brake systems, wherein it is desirable that both a clutch and the brake cannot be simultaneously energized. In certain embodiments of the invention, the time interval between the release of the brake and the engagement of the clutch may be selectively varied.

In accordance with a more specific aspect of the present invention, a clutch system includes a rotatable shaft with a low speed clutch assembly including friction clutch surfaces mounted about the shaft. A high speed clutch assembly is spaced from the low speed clutch assembly and also includes friction clutch surfaces mounted about the shaft. A brake assembly is disposed between the high and low speed clutch assemblies and includes a plurality of friction surfaces mounted about the shaft. A stationary housing is mounted about the brake assembly such that the brake friction surfaces engage the housing to brake the shaft when the clutch assemblies are disengaged. Structure is provided to selectively engage either of the clutch assemblies while concurrently disengaging the brake assembly. Structure may also be provided in order to adjust the time delay between the release of the brake and the engagement of the clutch.

In accordance with another aspect of the invention, a clutch system includes a rotatable shaft with high and low speed clutch assemblies spaced apart along the shaft. Each of the clutch assemblies includes an annular piston selectively movable to engage the clutch assembly. A brake assembly is mounted between the clutch assemblies and includes friction surfaces carried about the shaft. The brake assembly further includes a stationary housing mounted about the friction surfaces, the friction surfaces engaging the housing to brake the shaft when the clutch assemblies are disengaged. Annular brake plates are mounted on opposite sides of the brake assembly and adjacent pistons and brake plates are rigidly connected. The brake friction surfaces are thus disengaged when either of the clutch assemblies are engaged.

In accordance with a more specific aspect of the invention, a multi-speed clutch system includes a rotatable shaft with a high speed gear disposed adjacent the shaft. A high speed clutch assembly associated with the high speed gear is mounted about the shaft and includes first annular friction surfaces keyed to the shaft and second annular friction surfaces interspersed between the first friction surfaces and keyed to the high speed gear. A low speed gear is disposed adjacent the shaft and a low speed clutch assembly is spaced apart from the high speed clutch assembly and includes third annular friction surfaces keyed to the shaft. The low speed clutch assembly also includes fourth annular friction surfaces interspersed between the third friction surfaces and keyed to the low speed gear. A pair of spaced apart annular pistons are slidable along the shaft between the high and low speed clutch assemblies for selectively causing frictional engagement between the first and second friction surfaces or between the third and fourth friction surfaces. A brake assembly is mounted about the shaft between the pistons and includes a stationary housing keyed to fifth annular friction surfaces. The brake assembly further includes sixth annular friction surfaces interspersed between the fifth friction surfaces and keyed to the shaft. A pair of annular brake plates are disposed on opposite sides of the brake assembly and include a plurality of rigid bolts interconnecting each of the brake plates to the adjacent annular piston. Springs normally bias the brake plates against the fifth and sixth friction surfaces. Structure is provided to selectively apply pressurized fluid to either of the annular pistons to engage the respective clutch assembly while disengaging the brake assembly.

THE DRAWINGS

For a more complete understanding of the present invention, and for further objects and advantages thereof, reference is now made to the following description taken in conjunction with the accompanying drawings, in which:

FIG. 3 is a front view of the stationary brake housing of the invention;

FIG. 4 is a front view of one of the annular brake plates shown in FIG. 2;

FIG. 5 is a sectional view of the brake plate shown in FIG. 4 taken generally along the section line 5—5;

DESCRIPTION OF THE PREFERRED EMBODIMENT

Figure 1:
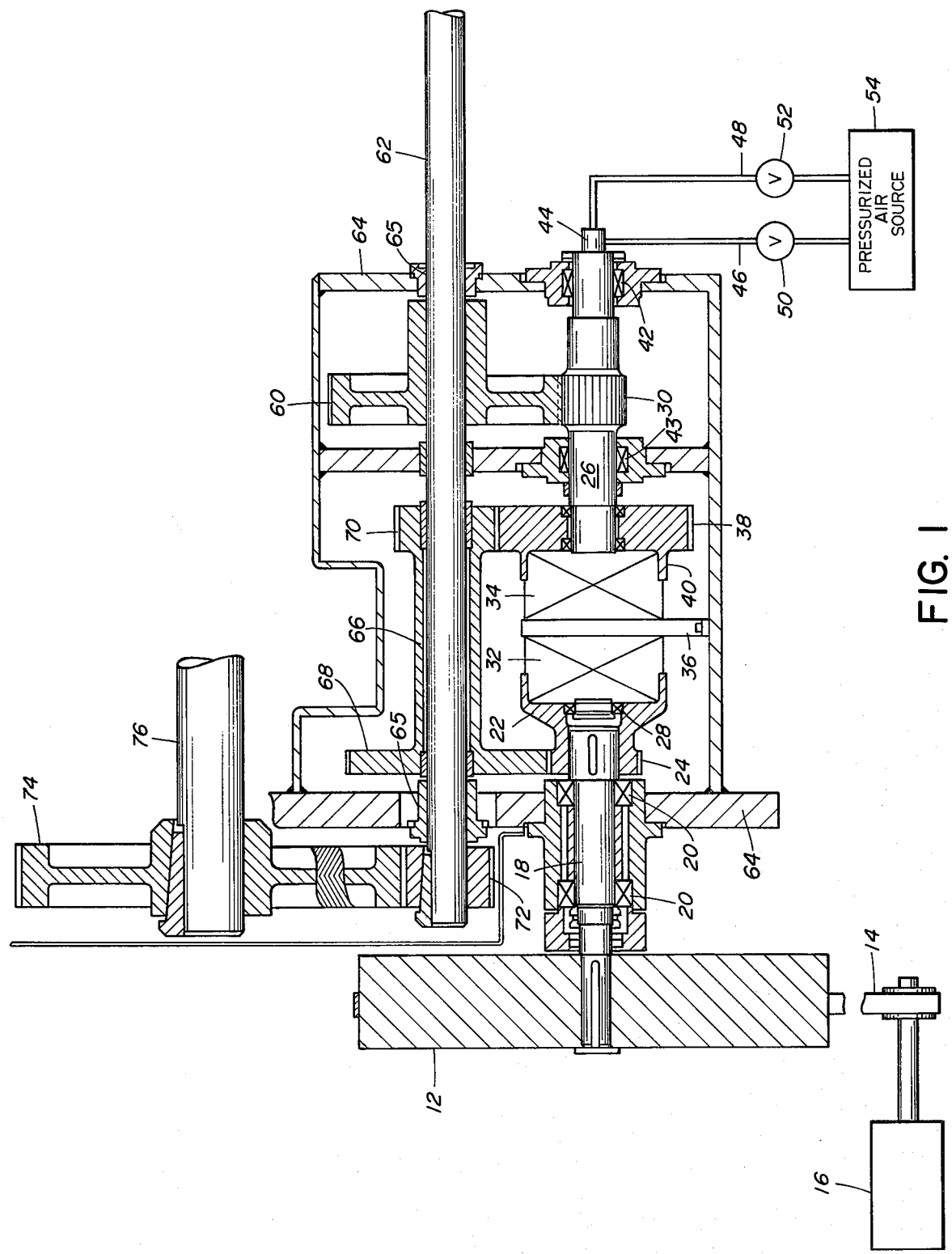
FIG. 1 is a partially sectioned view of a typical press brake system utilizing the present two-speed clutch and brake system of the invention.

Referring to FIG. 1, a flywheel 12 is rotated in a conventional manner by a continuous belt 14 driven by a motor 16. A driving shaft 18 is connected to the flywheel 12 by a suitable key and is journaled in bearings 20. The end portion of the driving shaft 18 is disposed within a housing and is connected to a spider 22 by a suitable key. The spider 22 includes an integral high speed driving gear 24.

A driven shaft 26 is coaxially aligned with the driving shaft 18 and is journaled at one end within spider 22 by bearings 28. A driving gear 30 is integrally formed on the shaft 26.

The present clutch and brake system includes a high speed clutch assembly 32 disposed around shaft 26 and spaced apart from a low speed clutch assembly 34. A stationary brake housing 36 is disposed between the clutch assemblies and encompasses a brake assembly to be subsequently described. The spider 22 engages the outer peripheries of friction clutch surfaces of the clutch assembly 32, while a driven gear 38 includes an annular spider 40 which engages the outer periphery of friction clutch surfaces of the clutch assembly 34. Driven gear 38 is rotatably mounted about shaft 26 by suitable bearings.

The end of shaft 26 is journaled in bearings 42 and 43 and communicates with a rotary union 44 outside of the housing. Pressurized air is directed through passages in the rotary union 44 from conduits 46 and 48. Valves 50 and 52 may be selectively operated by electrical control circuitry, not shown, to direct pressurized air from a pressurized air source 54 through the conduits 46 and 48. Passageways are defined through the shaft 26, in a manner to be subsequently described, to selectively actuate either of the clutch assemblies 32 or 34.

An important aspect of the present invention is that when either of the clutch assemblies 32 or 34 is actuated, the brake assembly of the invention is automatically disengaged. Alternatively, when both of the clutch assemblies 32 and 34 are disengaged, the brake assembly is engaged to prevent rotation of the shaft 26.

Gear 30 meshes with a gear 60 which is keyed to an intermediate shaft 62. The intermediate shaft 62 is disposed parallel to both the driving shaft 18 and the driven shaft 26, and is journaled in the outer housing walls 64 by suitable bearings 65. An idler member 66 is rotatably mounted on the intermediate shaft 62 and includes a first idler gear 68 which meshes with gear 24 and a second idler gear 70 which meshes with the driven gear 38. The end of the shaft 62 is keyed to a gear 72 which meshes with a herringbone gear 74. Gear 74 is keyed to an output shaft 76 which extends to drive a press brake or other press system. For further description of such a press brake drive system, reference is made to the previously described U.S. Pat. No. 3,498,424.

In operation of the system shown in FIG. 1, the flywheel 12 and the driving shaft 18 are rotated at a constant speed when the motor 16 is energized. When it is desired to rotate the output shaft 76 at a high rate of speed, the valve 50 is energized in order to direct pressurized air to engage the high speed clutch assembly 32. The driven shaft 26 is then directly connected to the driving shaft 18 through the spider 22 and the friction clutch surfaces of the clutch assembly 32. Rotation of gear 30 causes rotation of the gear 60 and the intermediate shaft 62. Gear 72 is then rotated to impart rotative motion to the herringbone gear 74 and the output shaft 76. As the clutch assembly 34 is not engaged at this time, the idler member 66 is rotated by the driving gear 24, but the idler gears 68 and 70 do not impart torque to the driven shaft 26.

If a lower speed of rotation is desired for the output shaft 76, the valve 52 is energized to supply pressurized air through the shaft 26 to engage the clutch assembly 34. Rotation is then imparted to the driven shaft 26 through the driving gear 24, the first idler gear 68, the second idler gear 70, the driven gear 38, the spider 40 and the friction clutch surfaces of the clutch assembly 34. Due to the relative gear sizes of the idler gears and the driven gear 38, rotation is imparted to the driven shaft 26 at a rate lower than the rate of rotation imparted by direct drive by the driving shaft 18. Rotative motion is provided to the output shaft 76 in the same manner as previously described through the gears 30 and 60 and the intermediate shaft 62. As clutch 32 is not engaged at this time, torque is not imparted through spider 22.

Figure 2:
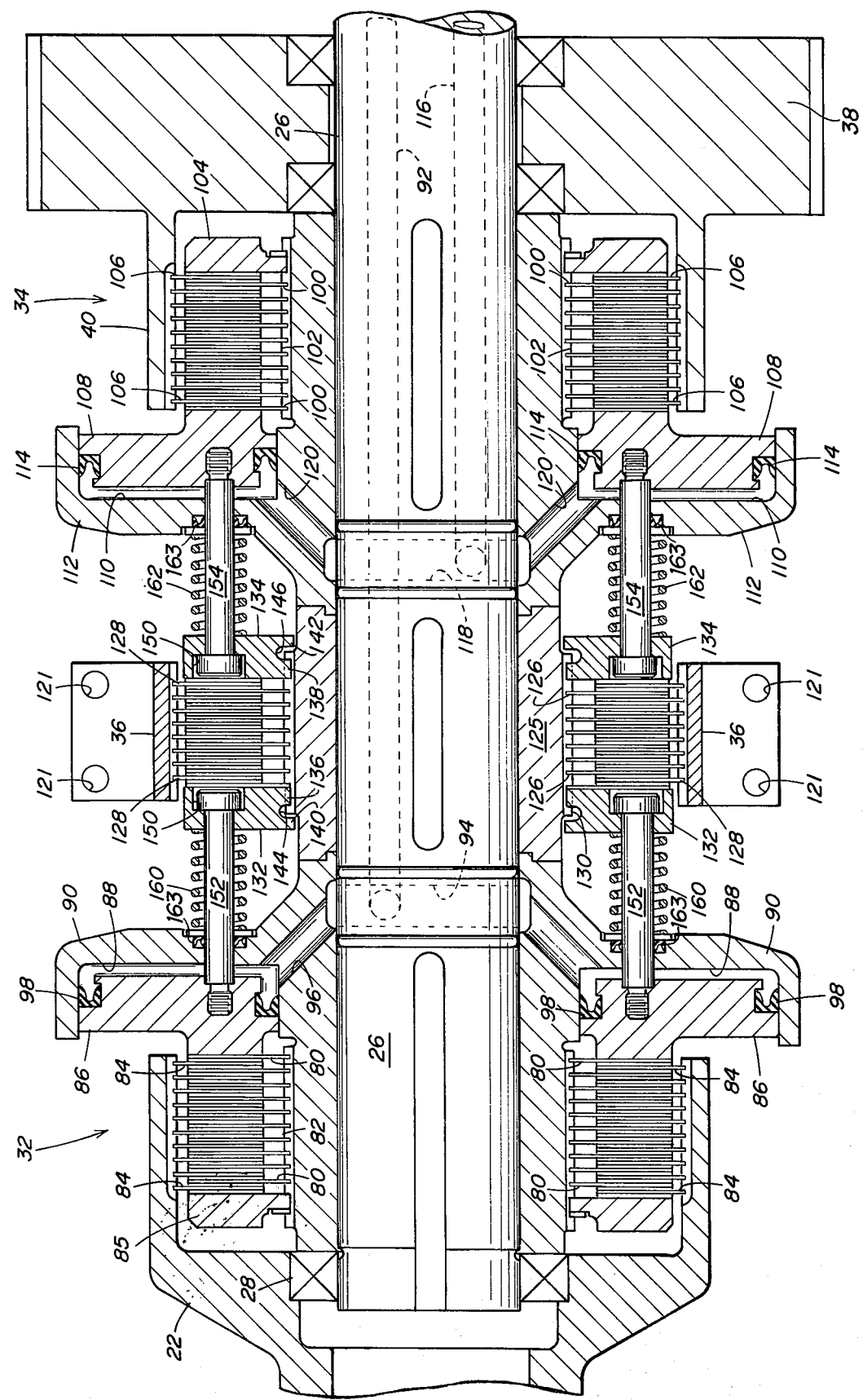
FIG. 2 is a partially sectioned side view of the preferred embodiment of the two-speed clutch and brake system of the invention.

FIG. 2 illustrates the clutch and brake system of the invention in greater detail. As previously noted, the end of the shaft 26 is journaled in spider 22 by bearings 28. The high speed clutch assembly 32 comprises a first set of spaced apart annular friction surfaces 80 which are carried by a housing 82 which is keyed to the shaft 26. A second set of annular friction surfaces 84 are interspersed between the surfaces 80 and are keyed at the outer peripheries thereof to the spider 22. An annular clutch piston 86 is slidable within an annular chamber 88 formed within a housing 90. A pressurized fluid passageway 92 extends through the shaft 26 into a cross passage 94. Passageways 96 extend from the cross passage 94 to the chamber 88. Seal members 98 provide an air seal to the chamber 88.

In operation of the high speed clutch assembly, pressurized air is applied through the passageway 92 and through the passageways 94 and 96 to move the piston 86 against the friction clutch surfaces 80 and 84 to engage the clutch assembly 32.

The low speed clutch assembly 34 is spaced along shaft 26 from the clutch assembly 32 and includes a set of friction clutch surfaces 100 which are carried by an annular housing 102 which is keyed to the shaft 26. A second set of annular friction surfaces 106 are interposed between the clutch surfaces 100 and are keyed at the outer peripheries thereof to the spider 40. An annular piston 108 is movable within a chamber 110 formed in the housing 112. Seal members 114 are provided to make the chamber 110 airtight. Pressurized air is applied through the shaft 26 by way of a passageway 116 which communicates with a cross passageway 118. Passageway 118 communicates with passageways 120 which communicate with the chamber 110. Thus, when pressurized air is applied through the passageway 116, the piston 108 is moved against the friction clutch surfaces 100 and 106 to engage the low speed clutch assembly 34.

The brake assembly is disposed between the clutch assemblies 32 and 34 and comprises the stationary housing 36 which is rigidly bolted to the machine housing by bolts 121. As shown in FIG. 3, the housing 36 includes flanges 122 for receiving bolts 121 and further includes a central cutout portion for receiving the shaft 26 and the brake assembly to be subsequently described. Gear teeth 124 are defined about the inner periphery of the central opening of the housing 36 for receiving the outer edges of the friction clutch surfaces of the brake assembly.

Referring again to FIG. 2, the brake assembly includes a brake hub 125 which is keyed to the shaft 26 and which carries a plurality of annular friction surfaces 126. A second set of annular friction surfaces 128 are interspersed between the friction surfaces 126 and engage the gear teeth 124 of the housing 36. The friction surfaces 126 mesh with gear teeth 130 extending from the hub 125. A pair of annular brake plates 132 and 134 are disposed on opposite sides of the brake friction surfaces and include portions 136 and 138 which mesh with the gear teeth 130 of hub 125. As shown in FIGS. 2, 4 and 5, the brake plates also include rearward stop portions 140 and 142 which are separated from the portions 136 and 138 by grooves 144 and 146.

Each of the brake plates includes a plurality of apertures 150 for receiving connecting bolts 152 and 154. As shown in FIG. 2, the heads of the bolts 152 and 154 fit in a countersunk portion of the brake plates, with the body of the bolt extending through the apertures 150. The ends of the bolts 152 and 154 are threadedly received within the adjacent clutch pistons 86 and 108. The use of a plurality of bolts 152 and 154, in conjunction with the brake plates 132 and 134, provides evenly distributed pressure for engagement of the brake assembly. Springs 160 and 162 are disposed about each of the bolts 152 and 154 and about the housings 90 and 112 and the brake plates 132 and 134. Seals 163 are provided at bolts 152 and 154 to prevent air from escaping chambers 88 and 110. When no pressurized air is applied through passageways 92 and 116 of shaft 26, clutches 32 and 34 are disengaged and springs 160 and 162 bias the brake plates 132 and 134 against the friction surfaces 126 and 128 to engage the brake. The shaft 26 is then braked through the friction surfaces 128 and 126 by way of the stationary housing 36.

When pressurized air is applied through passageway 92, the high speed clutch assembly 32 is engaged in the manner previously described. Movement of the piston 86 causes the brake plate 132 to be pulled away from the brake friction surfaces because of the interconnecting bolts 152. When this occurs, the friction surfaces 126 and 128 are disengaged and the shaft 26 is free to rotate.

Alternatively, when pressurized air is applied through passageway 116, the low speed clutch assembly 34 is energized. Movement of the piston 108 against the clutch friction surfaces causes the brake plate 134 to be moved out of engagement with the brake friction surfaces because of the interconnecting bolts 154. Again, the brake is released and the shaft 26 is free to rotate. Thus, when either of the clutch assemblies 32 or 34 is energized, the brake is automatically disengaged. When both of the clutch assemblies 32 and 34 are disengaged, the springs 160 and 162 force the brake plates 132 and 134 inwardly to engage the brake to stop rotation of shaft 26.

An important aspect of the invention is that upon energization of either of the clutch assemblies 32 or 34, the brake is not removed from the shaft 26 until one of the brake plates 132 or 134 has moved a small distance. Specifically, when clutch assembly 32 is energized, the springs 162 will cause brake plates 132 and 134 to move toward the clutch assembly 32 about 1/16 of an inch until the stop portion 142 arrests any further movement of the brake plate 134. During this short movement of the brake plate 134, the brake is still applied. This is advantageous in that a slight time delay is desirable in press and press brake systems to allow the brake to be engaged until the last possible moment prior to application of drive. In addition, when the speed of operation of the press or press brake is changed from high to low speeds, the brake assembly of the invention is momentarily applied in order to assist in slowing down the shaft 26.

The construction of the brake plates 132 and 134 is another important aspect of the invention. In case one or more of the springs 160 and 162 becomes weakened, the opposite brake plate will be pushed by the bias of its springs to compensate for the opposite weak spring. This compensation is limited by the stop portions 140 and 142 to prevent excessive compensation and to enable the brake to be disengaged upon engagement of either of the clutch assemblies 32 or 34.

As previously noted, an important aspect of the invention is that the brake may not be simultaneously engaged during application of drive to the shaft 26. Although the preferred embodiment of the invention has been described with respect to utilization of pressurized air, it will be understood that the present system may alternatively be utilized with hydraulic fluid and the like.

Figure 6:
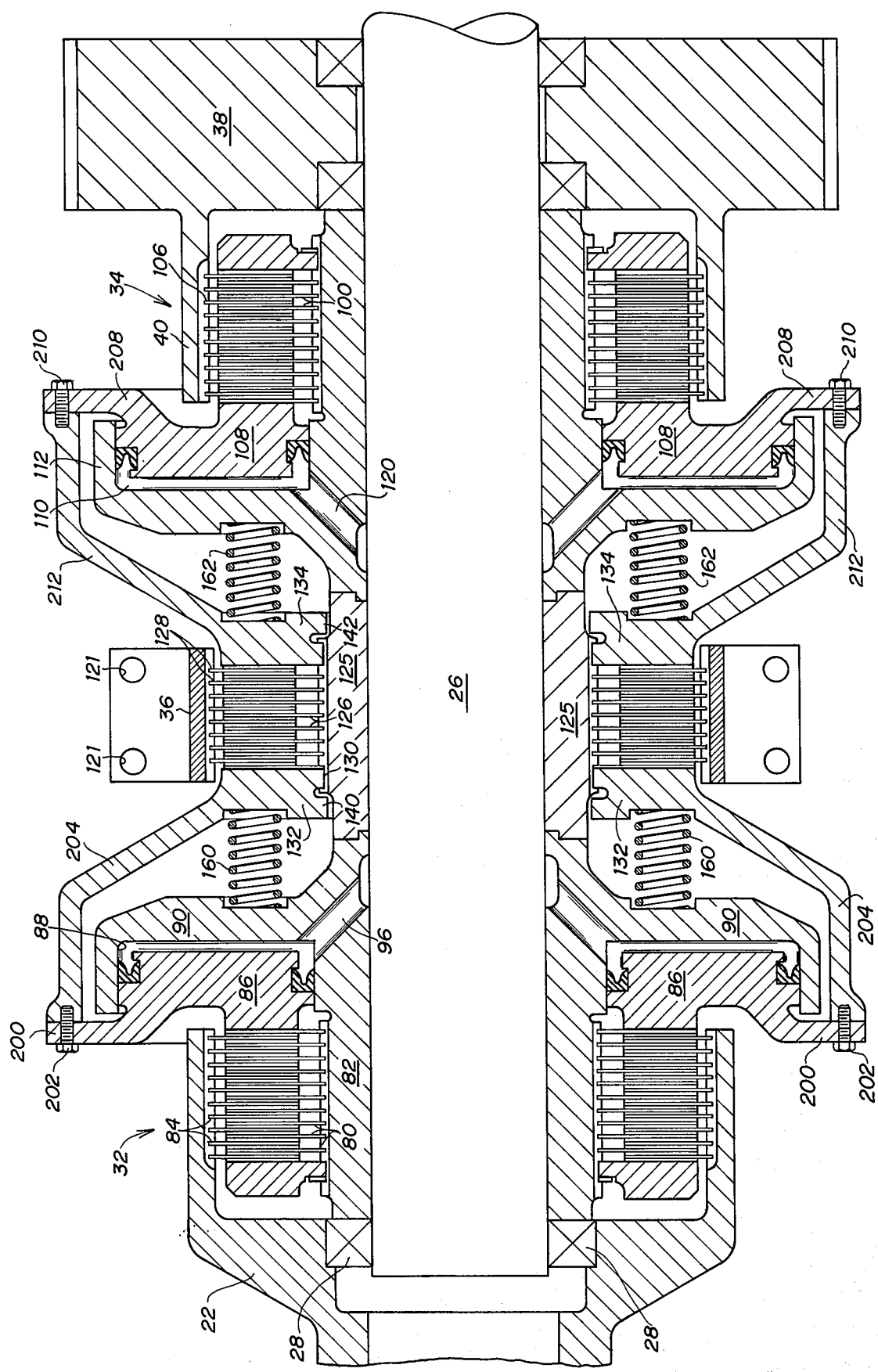
FIG. 6 is a partially sectioned side view of a second embodiment of the invention.

FIG. 6 illustrates a second embodiment of the invention which performs the function of the preferred embodiment shown in FIG. 2 with somewhat different structure. Like numbers are utilized for like and corresponding parts for the various figures of this specification.

The clutch and brake structure shown in FIG. 6 is similar to that shown in FIG. 2, in that shaft 26 is journaled at one end in a spider 22 by bearings 28. Portions of the shaft 26 previously shown are omitted for clarity of illustration. The high speed clutch assembly 32 again comprises a first set of spaced apart annular friction surfaces 80 which are carried by a housing 82 which is keyed to the shaft 26. The second set of annular friction clutch surfaces 84 are disposed between the surfaces 80 and are keyed to spider 22. Further, in the same manner as shown in FIG. 2, the annular clutch piston 86 is slidable within the annular chamber 88 formed in the housing 90. A fluid passageway 96 extends to the chamber 88 to provide pressurized fluid thereto in the manner previously described.

In this embodiment of the invention, the clutch piston 86 includes an extension 200 which extends radially outwardly and is connected by bolts 202 and to an extension 204 integrally formed with brake plate 132. The rigid interconnection of the extensions 200 and 204 thus take the place of the rigid bolts 152 previously described with respect to FIG. 2. The clutch piston 86 is thus rigidly interconnected with the brake plate 132.

Springs 160 are annularly spaced apart between the housing 90 and the brake plate 132 in a similar manner as that previously disclosed in order to normally urge the brake plate 132 toward the brake assembly. However, in this embodiment, the bolts 152 previously described in FIG. 2 do not extend through the springs 160. The brake plate 132 operates in the same manner as previously disclosed and includes stop portions 140 in order to limit the travel of the brake plate toward the brake assembly. However, the brake plate 132 is allowed to move toward the brake assembly for a short distance in order to provide a slight time delay between the disengagement of the brake assembly and the engagement of the low speed clutch.

The brake assembly is constructed in the same manner as that previously described and includes a stationary housing 36 which includes gear teeth 124 as shown in FIGS. 3 – 5. Friction surfaces 128 are disposed between friction clutch surfaces 126 which are carried by brake hub 125.

The low speed clutch assembly 34 includes a set of friction clutch surfaces 100 and a second set of clutch surfaces 106. The spider gear 40 is keyed to the clutch surfaces 106 in the manner previously described. The annular clutch piston 108 is disposed within the chamber 110 formed in the housing 112. The clutch piston 108 includes an extension 208 which is connected by bolts 210 to an annular extension 212 integrally extending from the brake plate 134. The brake plate 134 includes a stop member 142 in order to limit the movement of the brake plate 134 toward the brake assembly. A plurality of springs 162 is provided to urge the brake plate 134 toward the brake assembly. Passageway 120 provides pressurized fluid against the clutch piston 108 in order to engage the low speed clutch in the manner previously described. Upon energization of the low speed clutch, the brake plate 134 is moved by reason of the rigid connection between the extensions 208 and 212 away from the brake assembly. At this time, the annular brake plate 132 will then be forced toward the brake assembly by the spring 160. The brake is thus maintained in an energized condition for a short time interval until the stop member 140 abuts with the gear teeth 130 extending from the hub 125.

In this manner, the short delay before disengagement of the brake tends to prevent the press drive from backing up during inching operations in set-up of the press. Moreover, the time delay feature of the present brake assembly provides a short application of the brake during a change of speeds by the clutch to assist in change of speed.

Figure 7:
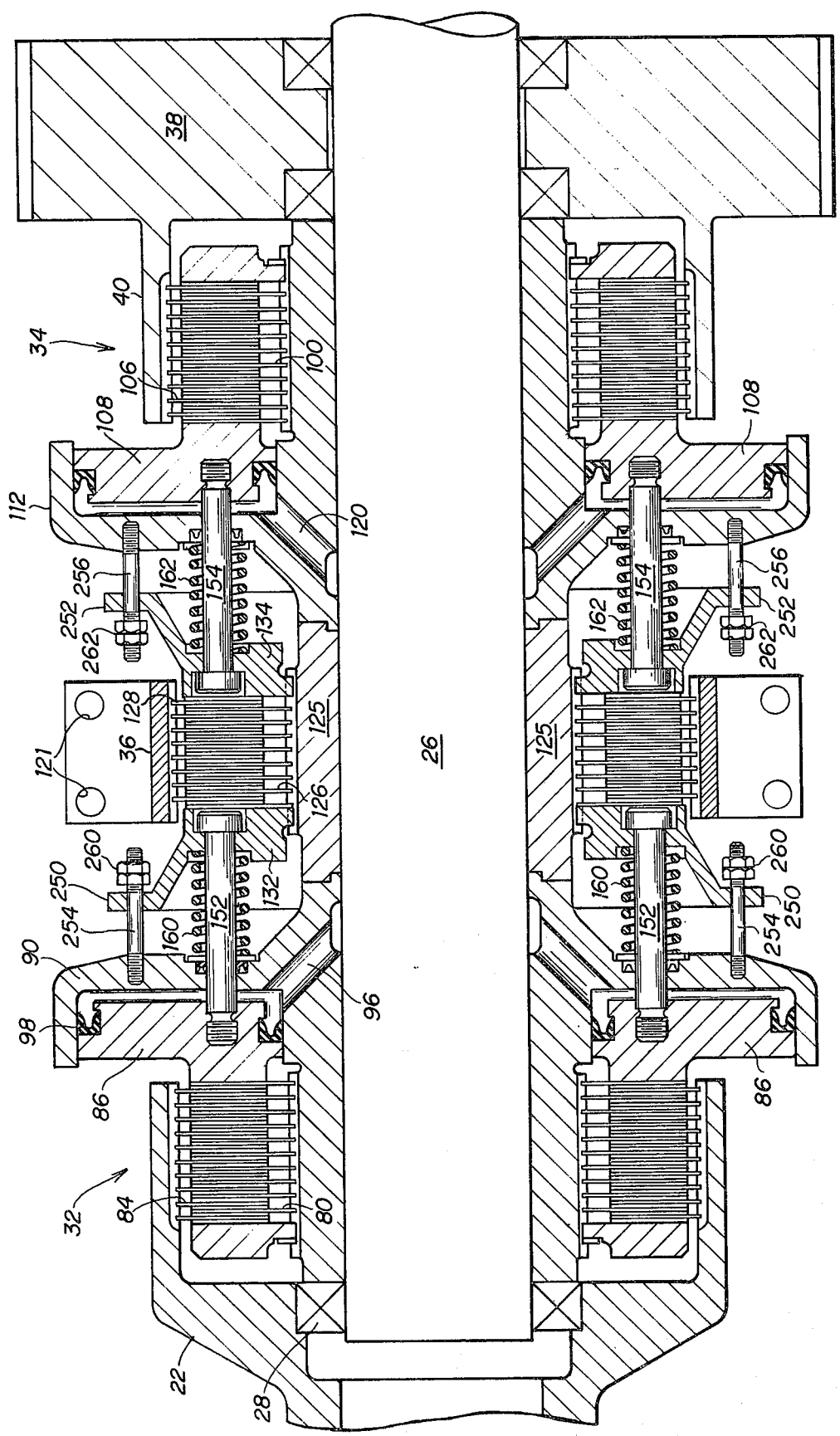
FIG. 7 is a partially sectioned side view of a third embodiment of the invention.

FIG. 7 is a third embodiment of the present invention, wherein like numbers are utilized for like and corresponding parts previously described. In FIG. 7, the high speed clutch assembly 32 is identical to that previously described in FIG. 2, and thus will not be described in detail. Similarly, the low speed clutch 34 is identical to the clutch shown in FIG. 2.

The brake assembly in the embodiment shown in FIG. 7 includes friction surfaces 128 and 126 in the manner previously described and also includes brake plates 132 and 134. However, in this embodiment, the brake plates include annular extensions 250 and 252, each of which includes apertures about the periphery thereof which receive bolts 254 and 256. The apertures in the extensions 250 and 252 are slightly of larger diameter than the outer diameter of the bolts 254 and 256, such that the extensions 250 and 252 may slide relative to the bolts. Adjustable nuts 260 and 262 are mounted on the ends of the bolts 254 and 256 in order to enable adjustment of the time delay between the energization of one of the clutches and the disengagement of the brake assembly. The ends of the bolts 254 are rigidly interconnected into the housing 90, while the ends of the bolts 256 are rigidly interconnected into the housing 112. The bolts 152 and 154 are rigidly interconnected between the clutch pistons and the brake plates of the invention in the manner shown in FIG. 2.

Springs 160 and 162 are disposed about the bolts in order to normally bias the brake plates 132 and 134 against the brake assembly. In operation of the system, when pressurized fluid is applied to the clutch piston 86, the high speed clutch assembly 32 is engaged and the brake plate 132 is moved away from the brake friction surfaces 126 and 128 in order to disengage the brake assembly. However, the brake plate 134 will be urged by the springs 162 against the brake friction surfaces 126 and 128 for a distance determined by the setting of the nuts 262 on bolts 256. During the short distance of travel toward the brake assembly by the brake plate 134, the brake assembly will remain engaged. When the extension 252 abuts against the nuts 262, the brake is then disengaged. The time delay between the engagement of the clutch assembly 32 and the brake assembly may be varied by varying the position of nuts 262 on the bolts 256. As previously noted, this adjustment of the time delay enables the system to be tailored for various operating conditions. Operation of the system when the low speed clutch assembly 34 is engaged is identical to that previously described.

It will thus be seen that the bolts 254 and nuts 260 operate to provide a variable stop mechanism similar to the stop portions 140 and 142 formed on the brake plates in FIG. 2. Such stop portions are thus not required on the brake plates 132 and 134 of the embodiment shown in FIG. 7.

Figure 8:
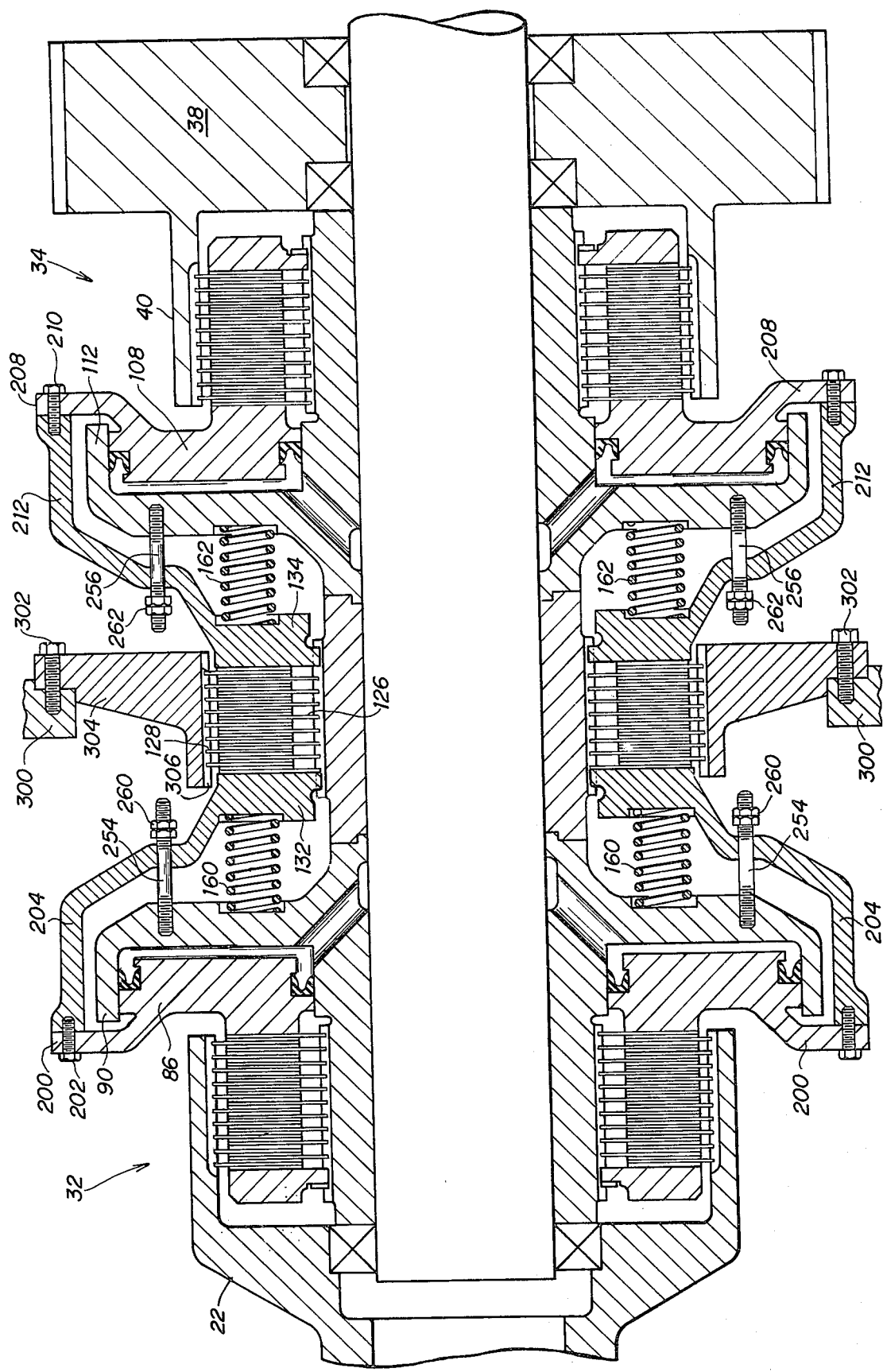
FIG. 8 is a partially sectioned side view of a fourth embodiment of the invention.

FIG. 8 discloses a fourth embodiment of the present invention which is a combination of the structure shown in FIGS. 6 and 7. The clutch assemblies 32 and 34 in this embodiment are identical to the clutch assemblies shown in FIG. 6, in that the clutch pistons 86 and 108 include extensions 200 and 208 which are rigidly interconnected by bolts 202 and 210 to extensions 204 and 212 which integrally extend from brake plates 132 and 134.

Springs 160 and 162 bias the brake plates 132 and 134 toward the brake assembly in the manner previously described in FIG. 6. The brake plates 132 and 134 in the embodiment shown in FIG. 8 do not include the stop portions formed thereon. Instead, bolts 254 and 256 are rigidly connected about housings 90 and 112 in the manner shown in FIG. 7. Nuts 260 and 262 may be adjusted on bolts 254 and 256 in order to set the desired time delay between the energization of either of the clutch assemblies and the disengagement of the brake in the manner previously described.

The stationary housing of the embodiment shown in FIG. 8 is somewhat different than that previously described, in that a stationary frame 300 is connected by bolts 302 to an annular member 304. Member 304 includes gear teeth 306 which engage with friction surfaces 128 of the brake assembly.

Operation of the embodiment shown in FIG. 8 is similar to that previously described. Movement of the clutch piston 86 is translated to the brake plate 132 in order to disengage the brake assembly. However, the brake plate 134 is allowed to travel a short distance toward the brake assembly such that the brake is applied during a short time interval after the energization of the clutch assembly 32. Operation of the low speed clutch assembly 34 is similar.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A clutch system comprising:
   a rotatable shaft,
   low and high speed clutch assemblies spaced apart along said shaft and including annular pistons selectively movable to engage said clutch assemblies,
   a brake assembly mounted between said clutch assemblies and including friction surfaces carried about said shaft, said brake assembly also including a stationary housing mounted about said friction surfaces, said friction surfaces engaging said housing to brake said shaft when said clutch assemblies are disengaged,
   annular brake plates mounted on opposite sides of said brake assembly, each of said brake plates including:
      an annular ring having a central opening, gear teeth defined around one portion of the central opening, an annular stop formed around a second portion of the central opening, and
   means for rigidly interconnecting adjacent pistons and brake plates, wherein said friction surfaces are disengaged when either of said clutch assemblies are engaged.

2. The clutch system of claim 1 and further comprising:
   means for delaying the release of said brake assembly for a predetermined increment of time prior to the engagement of either of said clutch assemblies.

3. The clutch system of claim 1 wherein said interconnecting means comprises a plurality of bolts annularly spaced about said shaft, springs disposed about each said bolt and biasing said brake plates toward said brake assembly, and
   each of said brake plates including apertures spaced about said ring for receiving said connecting members.

4. The clutch system of claim 1 wherein said clutch assemblies comprise:
   first annular friction surfaces keyed to said shaft,
   second annular friction surfaces disposed between said first surfaces and keyed to a gear,
   said friction surfaces when engaged by said pistons operable to impart motion from said shaft to said gear.

5. The clutch system of claim 1 wherein said housing includes gear teeth for engaging ones of said friction surfaces of said brake assembly.

6. The clutch system of claim 1 and further comprising:
   passages defined through said shaft for communicating pressurized fluid with said pistons for engagement of said clutch assemblies.

7. A multi-speed clutch and brake system comprising:
   a rotatable shaft,
   a high speed spider gear disposed adjacent said shaft,
   a high speed clutch assembly associated with said high speed spider gear and mounted about said shaft and including first annular friction surfaces which are keyed to said shaft and second annular friction surfaces interspersed between said first friction surfaces and keyed to said high speed spider gear,
   a low speed gear disposed adjacent said shaft,
   a low speed clutch assembly associated with said low speed gear and spaced apart from said high speed clutch assembly and including third annular friction surfaces keyed to said shaft and fourth annular friction surfaces interspersed between said third friction surfaces and keyed to said low speed gear,
   a pair of spaced apart annular pistons slidable between said high and low speed clutch assemblies for selectively causing frictional engagement between said first and second friction surfaces or between said third and fourth friction surfaces,
   a brake assembly mounted about said shaft between said pistons and including a stationary housing keyed to fifth annular friction surfaces, said brake assembly further including sixth annular friction surfaces interspersed between said fifth friction surfaces and keyed to said shaft,
   a pair of annular brake plates disposed on opposite sides of said brake assembly and including rigid connecting means interconnecting each of said brake plates to the adjacent annular piston each of said brake plates including:
      an annular ring having a central opening,
      gear teeth defined around one portion of the central opening,
      an annular stop formed around a second portion of the central opening, and
      apertures spaced about said ring for receiving said connecting members, whereby said ring may move toward said brake assembly for a prescribed distance until said annular stop abuts with the stationary surface,
   springs normally biasing said brake plates against said fifth and sixth friction surfaces, and
   means for selectively applying pressurized fluid to either of said annular pistons to engage the respective clutch assembly while disengaging said brake assembly.

8. The clutch system of claim 7 wherein said stationary housing comprises:
   a circular housing surrounding said fifth friction surfaces and including gear teeth for keying with the periphery of said fifth friction surfaces.

9. The clutch system of claim 7 and further comprising:
   fluid passages through said shaft and communicating with said pistons.

10. The clutch system of claim 7 wherein said springs are disposed about said connecting means.

* * * * *